US009929518B2

(12) United States Patent
Friesinger et al.

(10) Patent No.: US 9,929,518 B2
(45) Date of Patent: Mar. 27, 2018

(54) ASSEMBLED ELECTRICAL CABLE

(71) Applicant: MD ELEKTRONIK GmbH, Waldkraiburg (DE)

(72) Inventors: Johann Friesinger, Rechtmehring (DE); Karl Ott, Postmuenster (DE); Markus Lindner, Waldkraiburg (DE); Erich Fleischer, Dingolfing (DE); Petr Psutka, Plsen (CZ); Zdenek Kocur, Holysov (CZ); Petra Kallova, Prichovice (CZ)

(73) Assignee: MD ELEKTRONIK GmbH, Waldkraiburg (DE)

( * ) Notice: Subject to any disclaimer, the term of this patent is extended or adjusted under 35 U.S.C. 154(b) by 0 days.

(21) Appl. No.: 15/264,614

(22) Filed: Sep. 14, 2016

(65) Prior Publication Data

US 2017/0077658 A1 Mar. 16, 2017

(30) Foreign Application Priority Data

Sep. 15, 2015 (EP) .................................. 15 185 351

(51) Int. Cl.
*H02G 3/06* (2006.01)
*H01R 24/20* (2011.01)
(Continued)

(52) U.S. Cl.
CPC ............ *H01R 24/20* (2013.01); *H01R 9/032* (2013.01); *H01R 13/436* (2013.01);
(Continued)

(58) Field of Classification Search
CPC ...... H01R 24/20; H01R 9/032; H01R 13/436; H01R 13/6581; H01R 43/20; H01R 13/03;
(Continued)

(56) References Cited

U.S. PATENT DOCUMENTS

| | | | | |
|---|---|---|---|---|
| 7,044,789 B2 * | 5/2006 | Yohn | H01R 13/6592 | 439/599 |
| 8,911,254 B2 * | 12/2014 | Montena | H01R 9/032 | 439/579 |
| 8,974,243 B2 * | 3/2015 | Friese | H01R 13/4367 | 439/595 |
| 9,543,670 B2 * | 1/2017 | Montena | H01R 9/032 | |
| 2003/0199205 A1 | 10/2003 | Kosmala | | |
| 2005/0032414 A1 | 2/2005 | Hoch et al. | | |
| 2010/0216353 A1 | 8/2010 | Wellmann | | |

(Continued)

FOREIGN PATENT DOCUMENTS

| | | | |
|---|---|---|---|
| DE | 4119202 | A1 | 12/1991 |
| DE | 20203788 | U1 | 6/2002 |

(Continued)

*Primary Examiner* — Angel R Estrada
(74) *Attorney, Agent, or Firm* — Leydig, Voit & Mayer, Ltd.

(57) ABSTRACT

An assembled electrical cable includes at least one core that is surrounded by an insulating sheath and that extends in a longitudinal cable direction between a first and a second free end of the cable. At the first free end of the cable, the core is freed of the insulating sheath and is provided with an electrical contact element. The core, together with the contact element thereof, is accommodated in an electrically insulating carrier. The carrier has at least one cutout through which the contact element is externally accessible. The contact element is provided in a section with an electrical insulation that differs from the insulating sheath.

16 Claims, 1 Drawing Sheet

(51) Int. Cl.

| | |
|---|---|
| ***H01R 13/6581*** | (2011.01) |
| ***H01R 43/20*** | (2006.01) |
| ***H01R 9/03*** | (2006.01) |
| ***H01R 13/436*** | (2006.01) |
| *H01R 13/03* | (2006.01) |
| *H01R 13/502* | (2006.01) |
| *H01R 107/00* | (2006.01) |

(52) U.S. Cl.
CPC ......... *H01R 13/6581* (2013.01); *H01R 43/20* (2013.01); *H01R 13/03* (2013.01); *H01R 13/502* (2013.01); *H01R 2107/00* (2013.01)

(58) Field of Classification Search
CPC .............. H01R 13/502; H01R 13/4367; H01R 13/6592; H01R 2107/00; H01B 7/00; H01B 7/04
USPC ................. 174/72 C, 68.1, 68.3, 73.1, 74 R; 248/68.1, 49; 439/752, 751, 598, 747, 439/579, 580, 595
See application file for complete search history.

(56) References Cited

U.S. PATENT DOCUMENTS

| | | | |
|---|---|---|---|
| 2012/0309227 | A1 | 12/2012 | Montena |
| 2013/0225014 | A1 | 8/2013 | Sato et al. |

FOREIGN PATENT DOCUMENTS

| | | | |
|---|---|---|---|
| DE | 102009010492 | B3 | 5/2010 |
| DE | 112011103439 | T5 | 8/2013 |

* cited by examiner

ASSEMBLED ELECTRICAL CABLE

CROSS-REFERENCE TO PRIOR APPLICATION

Priority is claimed to European Patent Application No. EP 15 185 351.2, filed on Sep. 15, 2015, the entire disclosure of which is hereby incorporated by reference herein.

FIELD

The present invention relates to an assembled electrical cable, as well as to a method for manufacturing such a cable.

BACKGROUND

An assembled electrical cable can include at least one core, in particular a plurality of cores, a respective core having an electrically insulating sheath and extending in the longitudinal cable direction between a first and a second free end of the cable and, at least at one end portion of the cable, being freed of the insulating sheath to form an electrical contact, and being provided with an electrical contact element—as a component that differs from the core—(i.e., electroconductively connected), for example, by crimping. A respective core of the cable is accommodated in an electrically insulating carrier and, in fact, in each case by the region thereof that is freed (stripped) of the insulating sheath and is provided with an electrical contact element. For this purpose, each carrier is provided with at least one cutout through which the contact element of a (respective) core is externally accessible to produce an electrical contact with a mating connector.

Such an assembled electrical cable is known, for example, from the U.S. Patent Application 2003/0199205 A1.

SUMMARY

In an embodiment, the present invention provides an assembled electrical cable that includes at least one core that is surrounded by an insulating sheath and that extends in a longitudinal cable direction between a first and a second free end of the cable. At the first free end of the cable, the core is freed of the insulating sheath and is provided with an electrical contact element. The core, together with the contact element thereof, is accommodated in an electrically insulating carrier. The carrier has at least one cutout through which the contact element is externally accessible. The contact element is provided in a section with an electrical insulation that differs from the insulating sheath.

BRIEF DESCRIPTION OF THE DRAWINGS

The present invention will be described in even greater detail below based on the exemplary FIGURE. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawing which illustrates the following.

DETAILED DESCRIPTION

Figure 1:
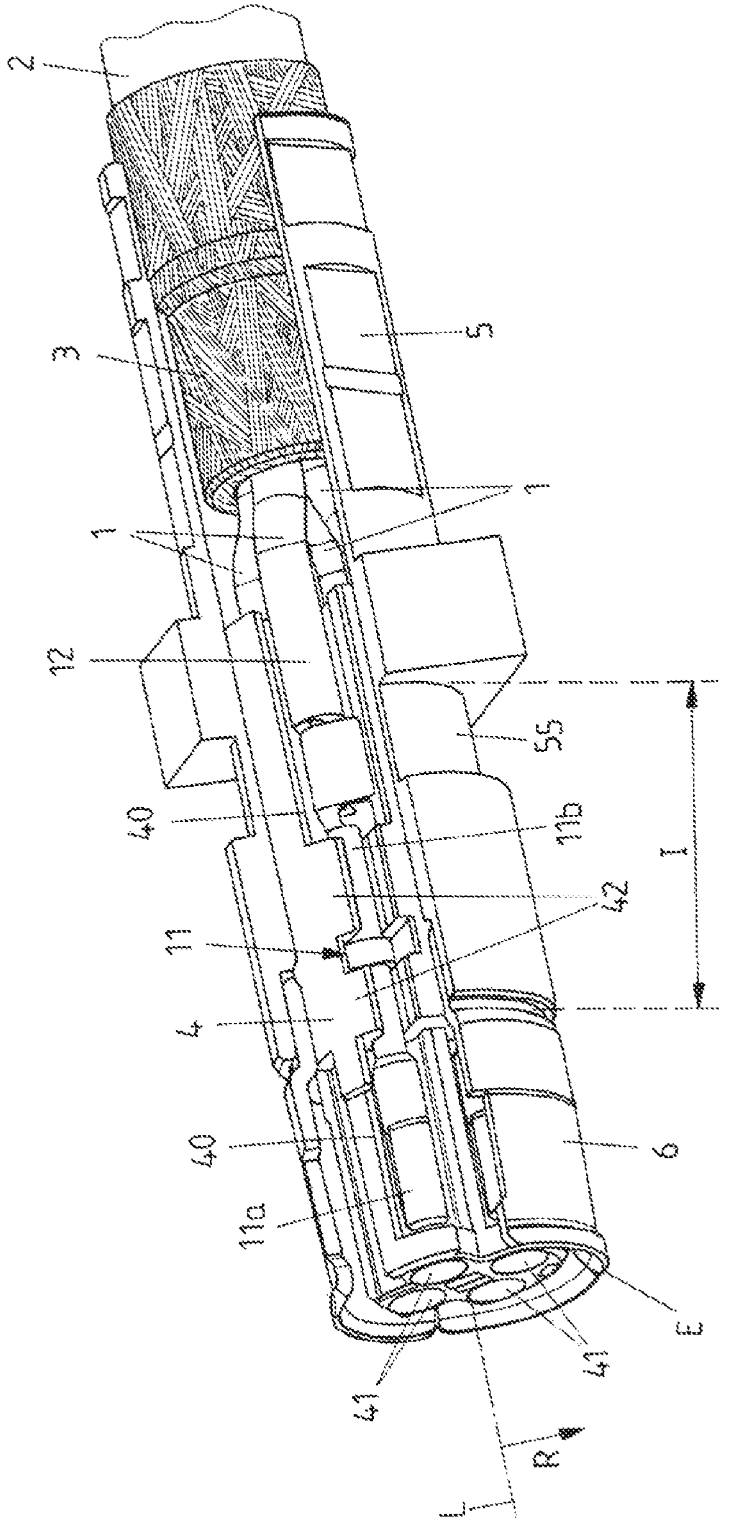
FIG. 1 illustrates the electrical cable according to an embodiment of the present invention.

The inventors have recognized a problem which arises during the manufacture of every assembled cable, which is that a portion of the stripped region of a core, in particular the contact element there, could come into unwanted electrical contact with another electrically conductive element, such as the residual wire of a braided shield provided on the cable, for example, upon sliding of an outer conductor sleeve onto a free end of the cable.

In an embodiment, the present invention improves an assembled electrical cable of the type mentioned at the outset and, in particular, overcomes the above-mentioned disadvantage.

According to an embodiment, the region of a respective core, that is provided with an electrical contact element and is accessible through the at least one cutout of the insulating carrier, is provided in one section, and, in fact, in a section that is not used as an electrical contact (for contacting a mating connector), with an electrical insulation that differs from the insulating sheath of the core. This may be a lacquer layer, a passivation layer, or an insulating foam, for example.

Using simple, inexpensive and virtually weight neutral means, the approach according to this embodiment of the present invention makes it possible to protect a section of the contact element of a respective core that is not to be used as an electrical contact, from unintentional electrical contacting with an electrically conductive foreign object. There is no need for such a section of the contact element of a respective core to be completely surrounded by the material of the corresponding carrier; on the one hand, thereby saving weight and, on the other hand, providing additional options for pre-terminating the cable.

An embodiment of the present invention may provide that the contact element of a respective core be accessible through the cutout of the corresponding carrier to produce an electrical contact with a mating connector in the radial direction relative to the longitudinal cable direction (thus, orthogonally to the longitudinal cable direction). At the same time, such a cutout may be used for radially introducing the contact element of a respective core into the insulating carrier, in particular for clipping it radially into place there. To this end, at least one latching projection may be configured on the carrier over the cutout. The section of the contact element that is accommodated in the corresponding carrier and is not used for electrical contacting with a mating connector is insulated on the outer surface thereof to prevent an unwanted electrical contact in this section.

That section of a respective contact element may thereby be electrically insulated, in particular selectively, once the respective contact element is introduced into the electrically insulating carrier through the at least one cutout thereof. This makes it possible to selectively insulate such parts of the contact element of a core that are accessible through a cutout of the carrier (however, that are not to be used as an electrical contact). Such locations of the contact element that rest against the carrier thereby remain free of the additional insulation.

An electrical connector is, in fact, already known from the German Patent Application DE 41 19 202 A1, where contact elements are coated with an insulating material to insulate them against a metallic housing block. However, this has nothing to do with the preceding objective addressed in an embodiment of the present invention which concerns accommodating the stripped ends of the cores of an electrical cable in an electrically insulating carrier.

In another embodiment, a method for manufacturing an assembled electrical cable is provided.

FIG. 1 shows a detail view of an electrical cable that extends in the usual manner in longitudinal cable direction L between two free ends. The detail view thereby shows the area surrounding a first free end E of the cable. The cable includes at least one core; in the exemplary embodiment, more specifically, four cores 1. A respective core 1 is thereby provided with an electrically insulating sheath 12; and cores 1 of the cable are surrounded by a cable jacket 2.

In the area of free end E, the cable is assembled to form an electrical connector for contacting a mating connector. For this, in the area of free end E, cores 1 are stripped, thus freed of insulating sheath 12, and provided with an electrical contact element 11 which—as a separate component that differs from core 1—is electroconductively connected to core 1, for example, by crimping. Contact element 11 of a respective core 1 is accommodated in an electrically insulating carrier 4, for example, made of plastic. A first section 11*a* of contact element 11 of a respective core 1, that is adjacent to free end E of the cable, serves as an electrical contact, while, on the other hand, disposed adjacently thereto, in the axial direction, i.e., in longitudinal cable direction L, second section 11*b* of contact element 11 is not to produce any electrical contact with a further electrical element.

Electrically insulating carrier 4 is provided with cutouts 40 (in the jacket thereof surrounding cores 1) through which contact element 11 of a respective core 1 is externally accessible in radial direction R, thus orthogonally to longitudinal cable direction L. On the one hand, this makes possible an electrical contacting of a respective core 1 at first section 11*a* of respective contact element 11.

On the other hand, cores 1 may be inserted into carrier 4 in radial direction R, along with respective contact element 11 thereof, through a respective cutout 40. Specifically, cores 1, along with respective contact element 11 thereof, may be clipped radially into place into carrier 4. For this purpose, the latter has latching projections 42 that project into a respective cutout 40.

The result is that a receptacle 41, into which respective contact element 11 latches and is simultaneously accessible in radial direction R, is formed in each case in carrier 4 for electrical contact element 11 of a respective core 1 of the cable.

Adjacent to respective contact element 11 of cores 1 in longitudinal cable direction L is a shield 3 in the form of a braided shield that surrounds cores 1 including respective insulating sheath 12.

Slid onto the cable in the area of end E, in addition, is an outer conductor sleeve 5 that, on the one hand, engages on shield 3 and, on the other hand—together with an outer connecting portion 6—surrounds electrically insulating carrier 4; in connecting portion 6, openings being provided that ensure the radial accessibility of first section 11*a* of contact element 11 of a respective core 1. Outer conductor sleeve 5 is connected by crimping (crimp connection) to electrically insulating carrier 4 at an attachment location 55.

In such a configuration, the problem arises that an electrical contact (short circuit) between contact element 11 of a respective core 1 and cable shield 3 must be reliably prevented upon sliding of outer conductor sleeve 5 onto electrically insulating carrier 4 in the axial direction (i.e., in longitudinal cable direction L). An unwanted electrical contact could be caused, for example, by a wire of the braided shield forming cable shield 3 being entrained upon sliding on of outer conductor sleeve 5 and being thereby pressed against contact element 11 of a core 1 and, in fact, through corresponding cutout 40. This concerns, in particular, second section 11*b* of contact element 11 of a respective core 1 disposed adjacently to cable shield 3. Since such a section 11*b* is not used for contacting a mating connector, rather is stripped primarily to allow radial introduction thereof into carrier 4, this section 11*b* of a respective contact element 11 is electrically insulated in accordance with the present invention at the outer surface thereof.

In the present case, a respective second section 11*b* at contact element 11 of a core 1 is advantageously electrically insulated once contact element 11 of corresponding core 1 is introduced into carrier 4 (however, before outer conductor sleeve 5 is slid on). Thus, a respective second section 11*b* may be selectively insulated at those locations that are externally accessible in each case through corresponding cutout 40 in carrier 4.

One variant provides that a respective second section 11*b* be insulated at contact element 11 of a core 1 by applying an insulating coating through respective associated cutout 40 of carrier 4. The coating may be undertaken, for example, by applying an insulating lacquer to second section 11*b*. Suitable lacquers may be readily sprayed onto respective section 11*b*, for example. When a UV-hardenable lacquer is used for forming an insulating layer, short processing times may also be achieved by using UV radiation to accelerate the drying of the lacquer.

Those regions of a respective section that engage (closely enough) on insulating carrier 4 remain free of the additional insulation when the insulation is subsequently applied to second section 11*b* of contact element 11.

Generally, it is a question of applying an insulating layer (separating layer) to second section 11*b* of contact element 11 of a respective core 1 or of insulating the surface of a respective section 11*b* in some other way. Besides the already described lacquering, other alternatives come under consideration for this.

Thus, the outer surface of a respective second section 11*b* may be passivated at contact element 11 of cores 1, for example, by electroplating the corresponding surface (using tin). It is also possible to use a foam or a shrink-on tubing to insulate second section 11*b* at contact element 11 of a respective core 1. However, in the case of the last-mentioned methods, it may not always be possible for second section 11*b* to be insulated only after contact element 11 of a respective core 1 is introduced into corresponding receptacle 41 on carrier 4.

In particular, when lacquer is used for the insulating coating of second section 11*b* at contact element 11 of a respective core 1, only a very small amount of material is associated with the insulation; thus, it is virtually weight neutral. At typical voltages of 12 V that are present on assembled cables, a lacquer layer of a few micrometers suffices to ensure adequate insulation of second section 11*b* of a respective core 1.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article “a” or “the” in introducing an element should not be interpreted as being exclusive of a plurality of elements. Likewise, the recitation of “or” should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An assembled electrical cable, comprising:

at least one core that is surrounded by an insulating sheath and that extends in a longitudinal cable direction between a first and a second free end of the cable, wherein, at the first free end of the cable, the core is freed of the insulating sheath and is provided with an electrical contact element, and an electrically insulating carrier in which the core, together with the contact element thereof, is accommodated, the carrier having at least one cutout through which the contact element is externally accessible in a radial direction, relative to the longitudinal direction of the cable, wherein the contact element is provided in a section with an electrical insulation that differs from the insulating sheath.

2. The electrical cable as recited in claim 1, wherein the contact element is introducible in the radial direction through the cutout into the carrier.

3. The electrical cable as recited in claim 2, wherein the contact element is snappable into place into the carrier.

4. The electrical cable as recited in claim 3, wherein at least one latching projection projects into the cutout to snap the contact element into place in the carrier.

5. The electrical cable as recited in claim 1, wherein the contact element is connected to the core by crimping.

6. The electrical cable as recited in claim 1, wherein the electrical insulation was applied to the section of the contact element following insertion of the contact element into the carrier.

7. The electrical cable as recited in claim 1, wherein the contact element does not have any electrical insulation at locations of the section where the contact element engages on the carrier.

8. The electrical cable as recited in claim 1, wherein, in a first section of the contact element which is adjacent to the first free end of the cable, the contact element is configured as an electrical contact for contacting a mating connector, and wherein the section of the contact element provided with the electrical insulation is a second section adjacent to the first section along the longitudinal cable direction.

9. The electrical cable as recited in claim 1, further comprising a cable shield which surrounds the core outside of the contact element thereof, the cable shield being disposed at an end portion of the cable that is adjacent to the first free end.

10. The electrical cable as recited in claim 9, wherein the cable shield is in the form of a braided shield.

11. The electrical cable as recited in claim 1, further comprising an electrical outer conductor which wraps around a cable shield and the insulating carrier.

12. The electrical cable as recited in claim 1, wherein an insulating coating is applied as the electrical insulation to the section of the contact element.

13. The electrical cable as recited in claim 12, wherein the insulating coating is in the form of a lacquer layer.

14. The electrical cable as recited in claim 12, wherein the insulating coating is in the form of a passivation layer.

15. The electrical cable as recited in claim 1, wherein the electrical insulation is disposed within a region of the cutout.

16. A method for manufacturing an assembled electrical cable that includes at least one core that is surrounded by an insulating sheath and extends in a longitudinal cable direction between a first and a second free end of the cable, wherein, at the first free end of the cable, the core is freed of the insulating sheath, the method comprising:

providing the core, at a stripped region thereof that is freed of the insulating sheath, with an electrical contact element, the core, together with the contact element thereof, being configured in an electrically insulating carrier that is provided with at least one cutout through which the contact element is externally accessible in a radial direction, relative to the longitudinal direction of the cable; and providing a section of the contact element with an insulation through the cutout of the carrier once the stripped region has been placed in the carrier.

* * * * *